United States Patent
Yocam et al.

(10) Patent No.: US 11,836,270 B2
(45) Date of Patent: *Dec. 5, 2023

(54) PRIVACY BREACH DETECTION

(71) Applicant: T-Mobile USA, Inc., Bellevue, WA (US)

(72) Inventors: Eric Yocam, Sammamish, WA (US); Richard White, Enumclaw, WA (US); Damon Laursen, Mukilteo, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/244,753

(22) Filed: Apr. 29, 2021

(65) Prior Publication Data
US 2021/0248265 A1   Aug. 12, 2021

Related U.S. Application Data

(63) Continuation of application No. 16/432,838, filed on Jun. 5, 2019, now Pat. No. 11,023,613, which is a (Continued)

(51) Int. Cl.
*H04W 4/021* (2018.01)
*H04W 12/00* (2021.01)
(Continued)

(52) U.S. Cl.
CPC ........ *G06F 21/6245* (2013.01); *H04W 4/021* (2013.01); *H04W 4/44* (2018.02); *H04W 12/00* (2013.01); *H04W 12/02* (2013.01)

(58) Field of Classification Search
CPC ... G06F 21/6245; H04W 12/00; H04W 12/02; H04W 4/021; H04W 4/44
See application file for complete search history.

(56) References Cited

U.S. PATENT DOCUMENTS

RE38,626 E   10/2004  Kielland
9,218,729 B2  12/2015  Meganathan
(Continued)

FOREIGN PATENT DOCUMENTS

WO   2013123445 A1   8/2013
WO   2014175721 A1  10/2014
WO   2016013925 A1   1/2016

OTHER PUBLICATIONS

SmartThings. "SmartThings Developer Documentation Release 1.0", Sep. 2015. Retrieved from <https://stdavedemo.readthedocs.io/_/downloads/en/latest/pdf/>. (Year: 2015).*

(Continued)

*Primary Examiner* — Michael Simitoski
(74) *Attorney, Agent, or Firm* — Perkins Coie LLP

(57) ABSTRACT

Systems and methods for privacy breach notification and protection enabled by the Internet of Things (IoT) are provided. Some embodiments establish a passive early warning privacy-breach detection from laser beam scan capability on a mobile device and IoT device when a particular owned object (or set of owned objects) has been laser scanned. Sensor information (e.g., laser beam sensing transparent adhesive tape, automotive cameras and proximity sensors) can be used to create notifications that allow a user to take action or to have peace of mind relating to particular activities such as to avoid fees and fines, to recover lost objects, to confirm known events, and to trigger activity.

20 Claims, 7 Drawing Sheets

Related U.S. Application Data continuation of application No. 15/394,765, filed on Dec. 29, 2016, now Pat. No. 10,325,112.

(51) Int. Cl.
  *H04W 12/02* (2009.01)
  *G06F 21/62* (2013.01)
  *H04W 4/44* (2018.01)

(56) References Cited

U.S. PATENT DOCUMENTS

| | | | |
|---|---|---|---|
| 9,382,747 B1* | 7/2016 | Anderson | H04L 12/2803 |
| 9,412,255 B1* | 8/2016 | Frost | G08B 21/18 |
| 9,641,989 B1* | 5/2017 | Dietrich | H04N 21/4788 |
| 9,752,840 B1* | 9/2017 | Betro | H04W 4/029 |
| 9,769,420 B1 | 9/2017 | Moses | |
| 9,836,625 B2 | 12/2017 | Khesin | |
| 9,843,645 B2* | 12/2017 | Kumar | H04W 12/06 |
| 10,271,093 B1* | 4/2019 | Jobanputra | H04N 21/835 |
| 10,325,112 B2 | 6/2019 | Yocam et al. | |
| 10,382,203 B1* | 8/2019 | Loladia | H04L 63/06 |
| 10,397,013 B1* | 8/2019 | Hill | H04L 12/281 |
| 10,454,783 B2 | 10/2019 | Burks et al. | |
| 2005/0150952 A1 | 7/2005 | Chung | |
| 2006/0085831 A1 | 4/2006 | Jones, III et al. | |
| 2008/0100447 A1 | 5/2008 | Powell et al. | |
| 2008/0152146 A1 | 6/2008 | Conrado et al. | |
| 2008/0311879 A1* | 12/2008 | Martin | G08B 25/14 455/404.1 |
| 2009/0033515 A1 | 2/2009 | Cavanaugh et al. | |
| 2009/0119468 A1 | 5/2009 | Taylor et al. | |
| 2010/0214149 A1 | 8/2010 | Kuhn | |
| 2011/0012729 A1 | 1/2011 | Hess | |
| 2011/0063079 A1 | 3/2011 | Groft et al. | |
| 2011/0138064 A1* | 6/2011 | Rieger | H04N 21/25816 707/715 |
| 2012/0122418 A1* | 5/2012 | Hicks, III | H04W 4/12 455/404.1 |
| 2012/0158161 A1 | 6/2012 | Cohn et al. | |
| 2013/0057388 A1 | 3/2013 | Attanasio et al. | |
| 2014/0009291 A1 | 1/2014 | Requist et al. | |
| 2014/0156829 A1 | 6/2014 | Lee et al. | |
| 2014/0187890 A1* | 7/2014 | Mensinger | A61B 5/145 600/365 |
| 2014/0222813 A1 | 8/2014 | Yang et al. | |
| 2015/0006998 A1 | 1/2015 | Cordero et al. | |
| 2015/0019342 A1* | 1/2015 | Gupta | G06Q 30/0269 705/14.66 |
| 2015/0058445 A1 | 2/2015 | Choi et al. | |
| 2015/0097961 A1 | 4/2015 | Ure et al. | |
| 2015/0112885 A1 | 4/2015 | Fadell et al. | |
| 2015/0339911 A1* | 11/2015 | Coyne | G06F 21/6218 340/517 |
| 2015/0350008 A1 | 12/2015 | Kim et al. | |
| 2015/0358777 A1 | 12/2015 | Gupta | |
| 2016/0006723 A1 | 1/2016 | Wilson | |
| 2016/0042283 A1 | 2/2016 | Kelly et al. | |
| 2016/0042621 A1 | 2/2016 | Hogg et al. | |
| 2016/0094421 A1* | 3/2016 | Bali | H04L 41/022 709/223 |
| 2016/0105644 A1 | 4/2016 | Smith et al. | |
| 2016/0112434 A1* | 4/2016 | Chung | H04L 63/0807 726/4 |
| 2016/0142503 A1 | 5/2016 | Lee et al. | |
| 2016/0150350 A1* | 5/2016 | Ingale | H04W 4/38 370/255 |
| 2016/0285974 A1* | 9/2016 | Shurtleff | H04L 67/54 |
| 2017/0024995 A1* | 1/2017 | Gu | G08B 1/00 |
| 2017/0067763 A1 | 3/2017 | Kodeswaran et al. | |
| 2017/0093593 A1 | 3/2017 | Yang | H04L 67/12 |
| 2017/0099353 A1* | 4/2017 | Arora | H04W 4/70 |
| 2017/0148280 A1* | 5/2017 | DeSalle | H04W 4/14 |
| 2017/0171090 A1* | 6/2017 | Britt | H04L 12/2803 |
| 2017/0171180 A1* | 6/2017 | Britt | G06F 16/9554 |
| 2017/0177013 A1 | 6/2017 | Malhotra et al. | |
| 2017/0188250 A1* | 6/2017 | Stevens | H04W 24/08 |
| 2017/0287335 A1 | 10/2017 | Ansari | |
| 2017/0342741 A1* | 11/2017 | Holland | H04W 12/069 |
| 2017/0346836 A1* | 11/2017 | Holland | H04W 4/80 |
| 2018/0059220 A1 | 3/2018 | Irish et al. | |
| 2018/0061220 A1* | 3/2018 | Greene | G08B 13/19695 |
| 2018/0082502 A1* | 3/2018 | Browning | G07C 9/00309 |
| 2018/0089425 A1 | 3/2018 | Trikalinou | |
| 2018/0152884 A1* | 5/2018 | Hu | H04W 8/18 |
| 2018/0183685 A1* | 6/2018 | Cook | H04W 4/08 |
| 2018/0189514 A1 | 7/2018 | Yocam et al. | |
| 2018/0205793 A1 | 7/2018 | Loeb et al. | |
| 2018/0249521 A1 | 8/2018 | Kim et al. | |
| 2019/0014004 A1* | 1/2019 | Horiuchi | H04L 41/147 |
| 2019/0037378 A1* | 1/2019 | Xia | H04L 63/0876 |
| 2019/0286845 A1 | 9/2019 | Yocam et al. | |
| 2020/0257608 A1 | 8/2020 | Fradkin | |

OTHER PUBLICATIONS

"TrackR." <https://www.thetrackr.com/>, accessed Jan. 3, 2017; screenshot, 1 page.
Cisco. "Internet of Things (IoT)." <http://www.cisco.com/c/en/us/solutions/internet-of-things/overview.html>, accessed Jan. 3, 2017; screenshot, 1 page.
"Meet the Tiles." <https://www.thetileapp.com/> accessed Jan. 3, 2017; screenshot, 1 page.
Visonic. Installation Instructions, "MCT-340 SMA". Oct. 2014, 3 pages.
Wikipedia, "Internet of things." <https://en.wikipedia.org/wiki/Internet_of_things> accessed Jan. 3, 2017, 29 pages.
Wired. "The Internet of Things is Far Bigger Than Anyone Realizes." <https://www.wired.com/insights/2014/11/the-internet-of-things-bigger>, accessed Jan. 3, 2017; screenshot, 1 page.

* cited by examiner

PRIVACY BREACH DETECTION

CROSS-REFERENCE TO RELATED APPLICATIONS

This application is a continuation of U.S. patent application Ser. No. 16/432,838, titled "PRIVACY BREACH DETECTION," filed Jun. 5, 2019, which is a continuation of U.S. patent application Ser. No. 15/394,765, titled "PRIVACY BREACH DETECTION," filed Dec. 29, 2016, now U.S. Pat. No. 10,325,112; which is hereby incorporated by reference in their entireties.

BACKGROUND

Modern communication networks and electronic devices have changed the way individuals in society interact and communicate. As these networks and devices have evolved so has the connectivity between user devices, networks of sensors, vehicles, buildings, appliances, machines, consumer goods and other items. This type of connectivity between objects is referred to as the Internet of Things (IoT) and has resulted in a number of benefits and new features. For example, IoT devices may be used to monitor and collect various kinds of data which can be used to make decisions, control actuators, and the like. However, these new features come at a potential cost. Namely, the ease of collection of personal information.

In many cases, individuals may agree to the collection of information in exchange for the features and options that improve the user's experience with the IoT device or object. In other cases, there is no expectation of privacy and these devices may be collecting information for a variety of uses without knowledge of the individuals. Many individuals, however, have a strong desire to understand what information is being collected, be notified of such collection, and have the ability to respond to and/or remove the collected data. Unfortunately, there are few options for understanding and identifying the different types of data collection that may be occurring throughout the day of an individual.

BRIEF DESCRIPTION OF THE DRAWINGS

Embodiments of the present technology will be described and explained through the use of the accompanying drawings in which.

Figure 1:
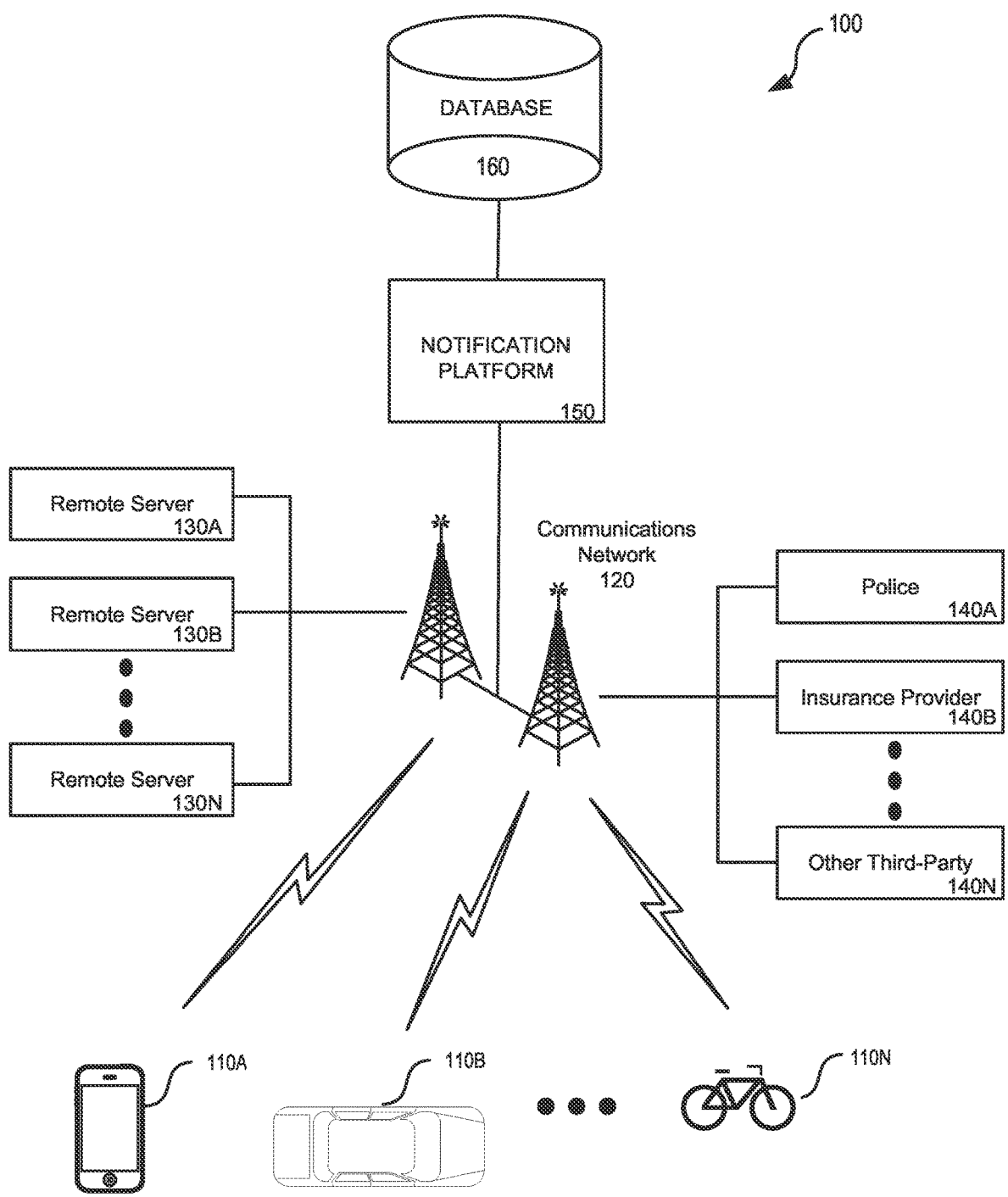
FIG. 1 illustrates an example of a communications environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments generally relate to systems and methods for privacy breach notification and protection enabled by the Internet of Things (IoT). For example, some embodiments provide for systems and methods to effectively establish a passive early warning privacy-breach detection from scans (e.g., laser scans) of IoT devices when a particular owned object (or set of owned objects) has been scanned by a laser or other reader. In various embodiments, sensor information (e.g., a laser beam sensing transparent adhesive tape, automotive cameras and proximity sensors) collected by the IoT device can be used to create notifications. In some cases, these notifications can allow a user to take action. For example, if a parked car is scanned, a notification can be sent to the user that could be used to avoid fees and fines. As another example, some embodiments of the technology can be used to recover lost objects, to confirm known events, and/or to trigger activity.

Some embodiments provide for an application that can alert the user that the IoT device has been scanned or that a triggering event has occurred. In addition, various notifications (e.g., SMS alerts from a carrier) can be generated and transmitted to police, insurance companies, etc. In addition to automatic notifications, some embodiments may use the detection of the triggering event to prompt the use of defense mechanisms, scrubbing based on information, and the like. Additionally, some embodiments allow notifications to be generated in response to a detection of scans of multiple IoT devices in a particular area. For example, if there is a photo enforcement signal at a particular location as multiple cars are scanned a notification can be sent to those individuals that normally travel that route that the photo enforcement is currently in place at that location.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to passive privacy breach notifications, embodiments of the present technology are equally applicable creating additional notifications in response to various triggering events.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of a communications environment 100 in which some embodiments of the present technology may be utilized. As illustrated in FIG. 1, communications environment 100 may include one or IoT devices 110A-110N (such as a mobile phone, automobile, refrigerator, sensor network, bicycle, tablet computer, mobile media device, mobile gaming device, vehicle-based computer, wearable computing device, etc.), communications network 120, remote application servers 130A-130N, third-party servers 140A-140N, notification platform 150 and database 160.

IoT devices 110A-110N can include network communication components that enable the IoT devices to communicate with remote application servers 130A-130N, third-party servers 140A-140N, notification platform 150, and/or other portable electronic devices by transmitting and receiving wireless signals using licensed, semi-licensed or unlicensed spectrum over communications network 120. In some cases, communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 120 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Those skilled in the art will appreciate that various other components (not shown) may be included in IoT devices 110A-110N to enable network communication. For example, an IoT device may be configured to communicate over a GSM mobile telecommunications network. As a result, the IoT device may include a Subscriber Identity Module (SIM) card that stores an International Mobile Subscriber Identity (IMSI) number that is used to identify the mobile device on the GSM mobile communications network or other networks, for example, those employing 3G, 4G, and/or 5G wireless protocols. If the IoT device is configured to communicate over another communications network, the IoT device may include other components that enable it to be identified on the other communications networks.

In some embodiments, IoT devices 110A-110N may include components that enable them to connect to a communications network using Generic Access Network (GAN) or Unlicensed Mobile Access (UMA) standards and protocols. For example, a mobile device may include components that support Internet Protocol (IP)-based communication over a Wireless Local Area Network (WLAN) and components that enable communication with the telecommunications network over the IP-based WLAN. IoT devices 110A-110N may include one or more sensors and/or applications that need to transfer data or check-in with remote servers 130A-130N, third-party servers 140A-140N, and/or notification platform 150.

In some embodiments, an owner of an IoT device can subscribe to a monitoring service. The IoT device can be registered and sensors integrated into an item or attached thereto that can be used to monitor for various triggering events (e.g., laser scan, movement, etc.). In response to detecting a triggering event, a time/date stamp can be recorded and additional sensors may be activated (e.g., a camera in a car may be activated in response to an unexpected acceleration from being bumped). The sensor information can be relayed to notification platform 150 via communications network 120. Notification platform 150 can access database 160 to lookup the subscriber and identify a set of notification rules. These rules can identify how various notifications should be delivered to the subscriber and/or other third-parties such as the police, insurance providers and the like. The following is a table of notifications rules that may be stored within database 160:

| Subscriber Identifier | Triggers | Notifications |
|---|---|---|
| 310150123456789 | Window down and raining | Owner |
| | Acoustic signature indicating likely window break | Owner Police Insurance Company |
| | Acceleration signature indicating likely accident | Owner Police Insurance Company |
| | Laser scan while car is parked | Owner |
| 310150124456789 | Laser scan while car is parked | Owner |
| | Movement signature indicating bicycle moved during a period of time identified by the owner | Owner Police |

One example of the present technology can allow an IoT device owner to use cameras found on the device in an active mode and work in conjunction with other sensors to detect when a laser beam has scanned the device owner. The device owner can then be alerted that they have been scanned and can take any necessary action (e.g., look around to view the laser scanning device, move away from the location, and/or confirm a particular activity).

As another example, a sensor within a car (or other object) can be used to detect when a scanning event such as a parking meter officer has scanned the VIN serial number located on the driver side windshield, front license plate, back license plate, or parking permit serial number located on automobile windows. The sensor can transmit this information to notification platform 150 which can generate an alert based on the scan sensor data that has been detected. In response to receiving this information, the user may be able to avoid receiving a ticket from the meter officer based on entry of a ticket to the city's central parking ticketing processing database. Similarly, an IoT device owner can be alerted when an event such as a bicycle serial number located on bicycle license sticker found on the lost or stolen bicycle. Once the user receives the alert (e.g., via SMS or e-mail via a mobile phone) based on the sensor data that has been detected when entered into city's police central lost or stolen ticketing processing database.

Figure 2:
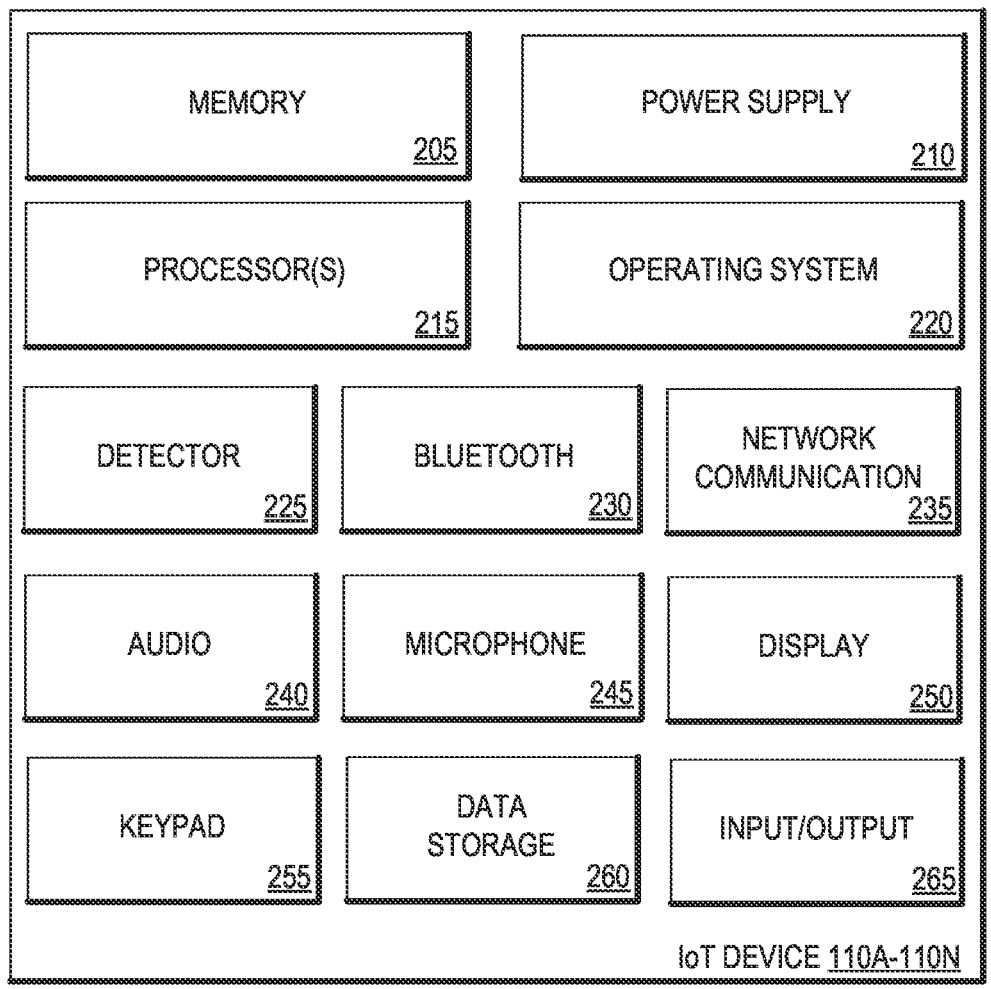
FIG. 2 illustrates a set of components within an IoT device according to one or more embodiments of the present technology.

FIG. 2 illustrates a set of components of an IoT device 110A-110N according to one or more embodiments of the present technology. As shown in FIG. 2, IoT device 110A-110N may include memory 205 (e.g., volatile memory and/or nonvolatile memory), power supply 210 (e.g., battery), processor(s) 215 for executing processing instructions, and operating system 220. Additional components such as detectors and sensors 225, one or more network interfaces (e.g., Bluetooth Interface 230; and Network Communication Interface 235, which enables the IoT device to communicate by transmitting and receiving wireless signals using licensed, semi-licensed or unlicensed spectrum over a telecommunications network), audio interface 240, microphone 245, display 250, keypad or keyboard 255, data storage 260 (e.g., hard drive, flash memory, memory card, etc.), and other input and/or output interfaces 260. The various components of the IoT device may be interconnected via a bus.

Processor(s) 215 are the main processors of IoT device 110A-110N which may include application processors, baseband processors, various coprocessors, and other dedicated processors for operating IoT device 110A-110N. For example, an application processor can provide the processing power to support software applications, memory management, graphics processing, and multimedia. An application processor may be communicably coupled with memory 205 and configured to run the operating system, the user interface, and the applications stored on memory 205 or data storage component 260. A baseband processor may be configured to perform signal processing and implement/manage real-time radio transmission operations of IoT device 110A-110N. These processors along with the other components may be powered by power supply 210. The volatile and nonvolatile memories found in various embodiments may include storage media for storing information such as processor-readable instructions, data structures, program modules, or other data. Some examples of information that may be stored include basic input/output systems (BIOS), operating systems, and applications.

Figure 3:
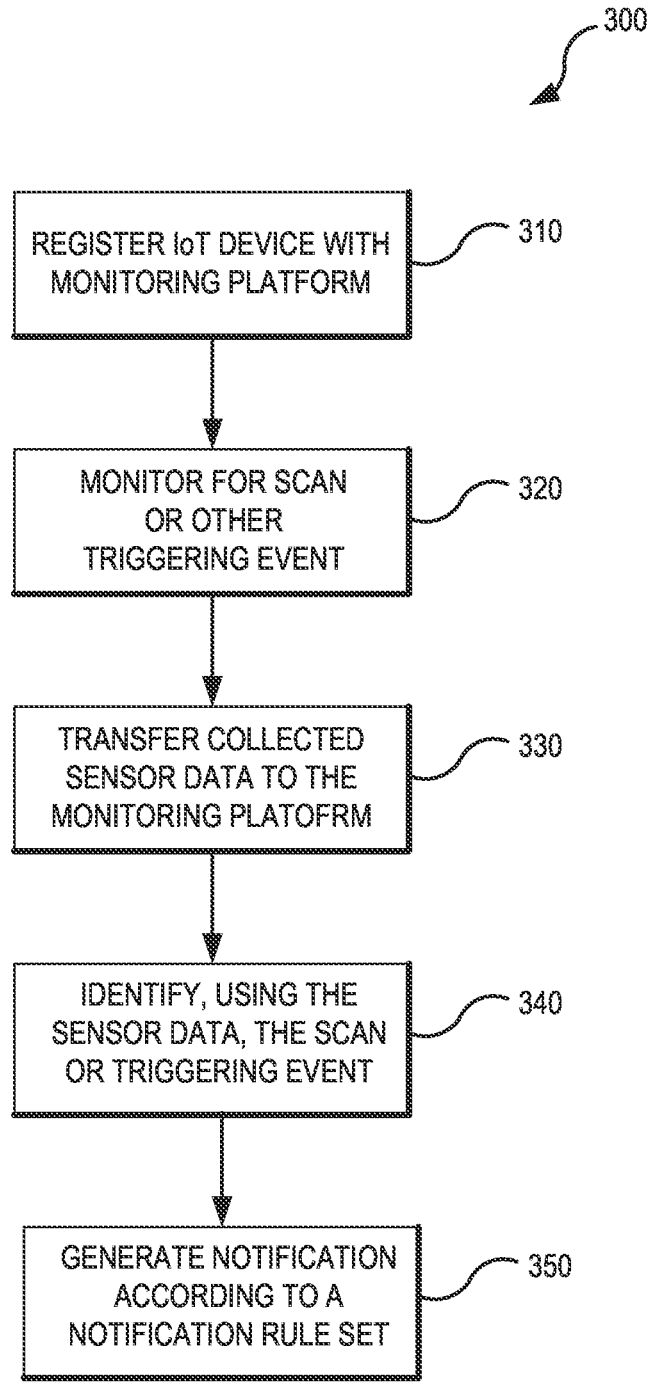
FIG. 3 is a flowchart illustrating a set of operations for automatically generating a notification in accordance with some embodiments of the present technology.

FIG. 3 is a flowchart illustrating a set of operations 300 for automatically generating a notification in accordance with some embodiments of the present technology. As illustrated in FIG. 3, an IoT device can be registered with a monitoring platform during registration operation 310. The registration of the device can include information such as, but not limited to, sensor availability, contact information, unique identifiers, notification rules, triggering events, and the like. For example, if the IoT device is an automobile, the available sensors may include integrated sensors (e.g., infrared sensors and filters that identify when a scan has occurred) on license plates or vehicle identification numbers (VINs), cameras, microphones, accelerometers, and the like.

Once the IoT device has been registered with the system, the IoT device can monitor for a scan or triggering event during monitoring operation 320. Triggering events can include any type of event to which a user may desire to receive a notifications. For example, while a car owner may desire to know when a car window is down and it is raining outside. Similarly, a car owner may desire to know when the car is hit within a parking lot. Once the triggering events are set, the information collected using one or more sensors of the IoT device can be transferred to the monitoring platform during transfer operation 330. In accordance with some embodiments, the transfer may occur using a communication network such as a cellular network.

Once the data collected by the sensors is received by the monitoring platform, identification operation 340 can identify information about the scan or event. Then, generation operation 350 can generate a notification according to a notification rule set. The notifications may include a variety of information (e.g., date/time, sensor data, pictures, location, etc.) and may be transferred to one or more recipients. For example, if the triggering event associated with an automobile is an unexpected acceleration (e.g., the car is hit by another car), acoustic trigger (e.g., glass break of a car), or other data indicating damage to the car, the data collected may immediately be transferred to an insurance company, police agency, the owner of the car, and/or other third-party. In some cases, insurance companies may offer discounts for such features.

Figure 4:
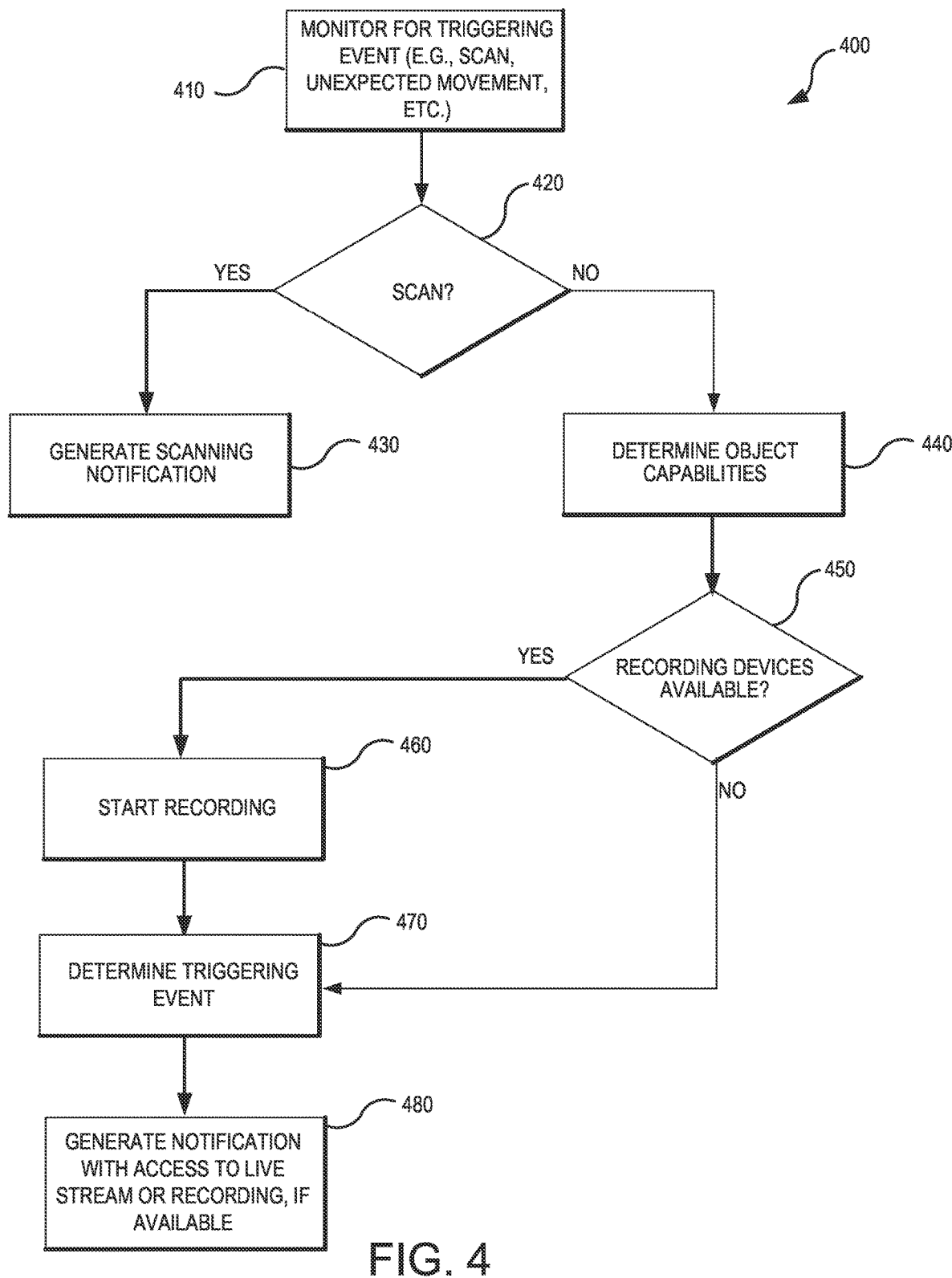
FIG. 4 is flowchart illustrating a set of operations for generating notifications in response to a triggering event in accordance with one or more embodiments of the present technology.

FIG. 4 is flowchart illustrating a set of operations 400 for generating notifications in response to a triggering event in accordance with one or more embodiments of the present technology. As illustrated in FIG. 4, monitoring operation 410 monitors for a triggering event using one or more sensors of the IoT device. Examples of the triggering event can include a laser scan, accelerations, acoustic patterns (e.g., glass break, etc.), movement, and the like. Scanning determination operation 420 determines whether the triggering event was a scan (e.g., laser, RF, etc.).

If determination operation 420 determines that the IoT device received a scan, then determination operation 420 branches to notification operation 430 where one or more notifications are generated to alert an owner of the IoT device of the laser scan. In some embodiments, the notifications may include information from the IoT device, the scan itself and/or from external sources. For example, in some embodiments, the scan may include coded information that identifies the source of the scan (e.g., police, HOV lane, etc.). Other scanners may be required to transmit identification information using another channel (e.g., a radio frequency channel, an advertisement channel, etc.) that can be accessed by the IoT device or notification platform where the IoT device includes a radio receiver or other receiver to receive or access the identification information on the other channel.

If determination operation 420 determines that the IoT device did not receive a scan, then determination operation 420 branches to capability operation 440 where IoT device capabilities are determined. Using the capabilities determined by capability operation 440, determination operation 450 determines if any recording devices (e.g., camera, microphone, etc.) are available on the IoT device. If recording operation 450 determines that recording devices are available, then recording operation 450 branches to recording operation 460 where the recording devices are activated (e.g., by sending a signal via a wireless cellular network).

Using the information from the sensors and/or recording devices, identification operation 470 identifies the triggering event. This triggering event can then be used to generate notifications with access to live sensor data and/or recordings, if they are available, during notification operation 480. In accordance with some embodiments, the notifications generated by notification operation 480 may include requests for the information collected by a remote application running on an electronic device. If determination operation 450 determines that no recording devices are available, then determination operation 450 branches to identification operation 470. In some embodiments, a user may respond to the notifications generated by notification operation 480. For example, the user may respond using a mobile application which generates one or more signals or messages that contain information and/or instructions for responding to the notification. As one example, if the notification indicates that the car window is down while rain is detected, a user may respond with a command to close the window. This command can be processed and transmitted (e.g., using a cellular network) to the car.

Figure 5:
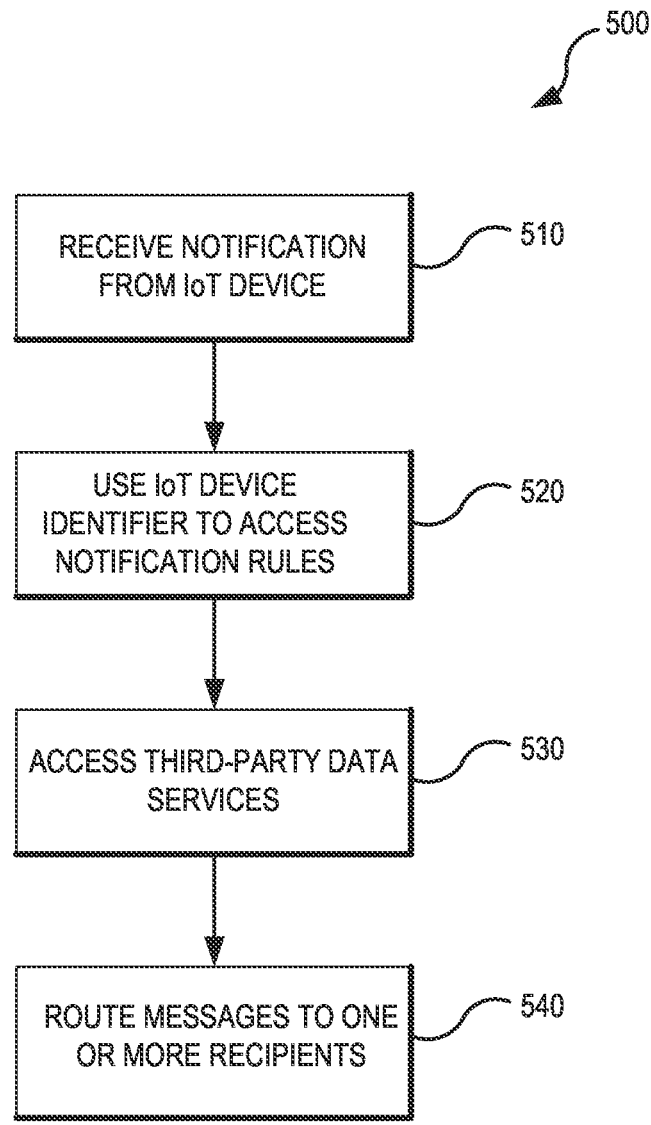
FIG. 5 is flowchart illustrating a set of operations for routing notifications in response to a triggering event in accordance with one or more embodiments of the present technology.

FIG. 5 is flowchart illustrating a set of operations 500 for routing notifications in response to a triggering event in accordance with one or more embodiments of the present technology. In accordance with various embodiments, these operations may be performed by components (e.g., processors, modules, etc.) of a notification platform or other device. As illustrated in FIG. 5, receiving operation 510 receives a notification from the IoT device. The notification can include device identifiers, sensor data, time stamps, location data (e.g., GPS coordinates), and other information. Access operation 520 uses the identifier in the notification to access a set of notification rules for how to respond to triggering events. In some embodiments, the notification rules include a request to access third-party data services to collect more information using access operation 530. For example, the third-party data services may include weather services, location of scanners (e.g., in HOV lanes), and the like. This information can be used to generate messages to one or more recipients during generation operation 540.

Figure 6:
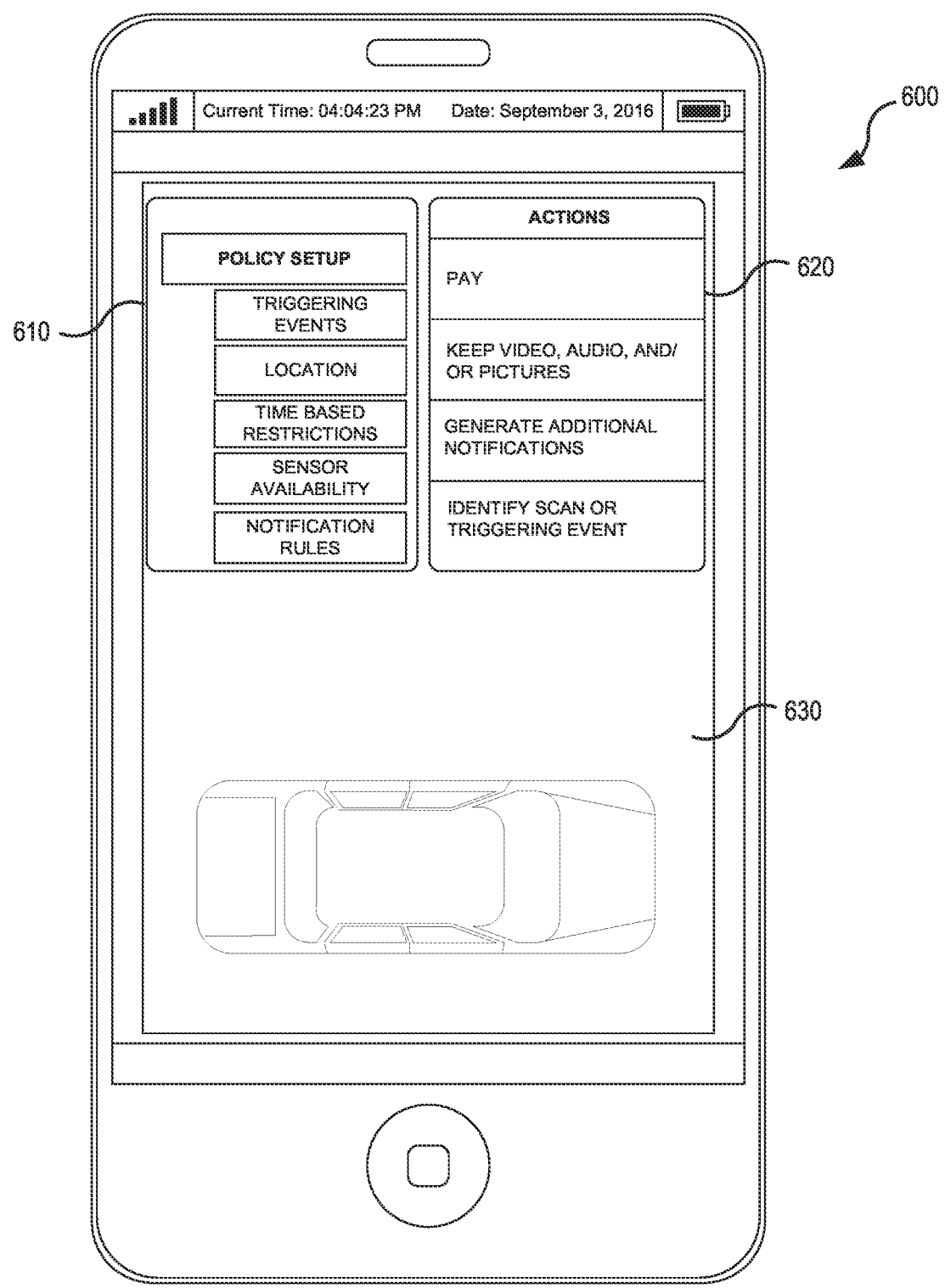
FIG. 6 is an example of a graphical user interface that may be used in accordance with some embodiments of the present technology.

FIG. 6 is an example of a graphical user interface 600 that may be used in accordance with some embodiments of the present technology. In accordance with various embodiments, graphical user interface 600 may be part of a stand-alone application, accessed via a thin client, deployed via the cloud, or even integrated at the operating system level. The graphical user interface may be displayed in response to a request from a user, detection of a triggering event, and/or other condition.

Graphical user interface 600 can include policy setup bar 610 that can allows a user to register an IoT device, setup policies and/or modify policies. Once an IoT device is registered and a triggering event has been detected, action bar 620 can be used to respond. For example, using action bar 620 a user may be able to pay a fine or add more time to a parking meter. Similarly, the user may be able to request that sensor data, video, pictures, audio files and the like collected by the IoT device be stored. As another example, action bar 620 may be used to generate additional notifications or to request more information about the scan or triggering event. Graphical user interface 600 may also include a display portion 630 where video feeds (e.g., real-time, near real-time, or stored videos) may be played, pictures can be viewed, and/or sensor data can be analyzed.

Exemplary Computer System Overview

Aspects and implementations of the privacy breach notification system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 7:
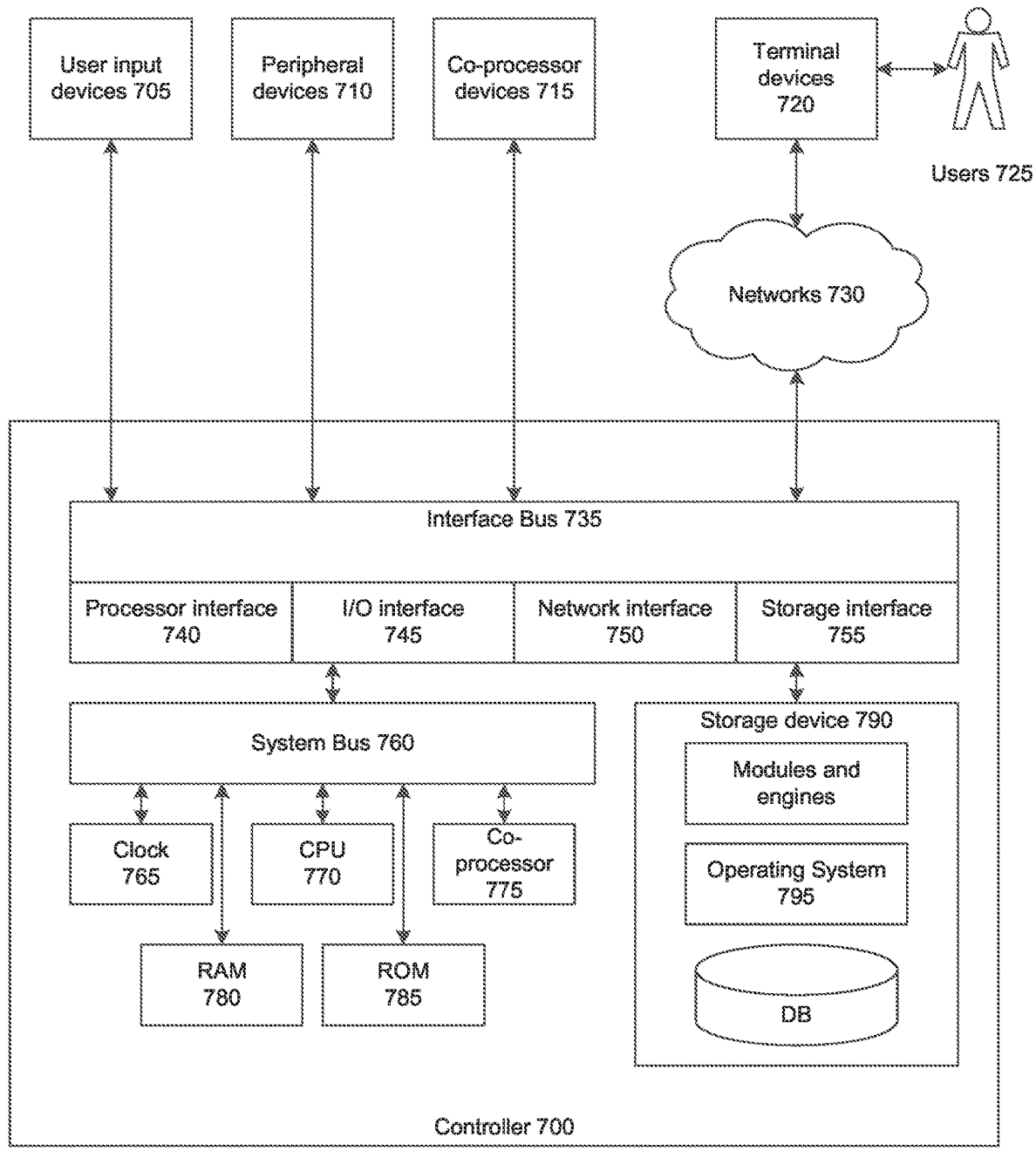
FIG. 7 is a block diagram illustrating a computer systemization according to various embodiments of the present technology.

FIG. 7 is a block diagram illustrating an example machine representing the computer systemization of the notification system. The notification controller 700 may be in communication with entities including one or more users 725, client/terminal/IoT devices 720 (e.g., devices 110A-110N), user input devices 705, peripheral devices 710, an optional co-processor device(s) (e.g., cryptographic processor devices) 715, and networks 730 (e.g., 120 in FIG. 1). Users may engage with the controller 700 via terminal devices 720 over networks 730.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 700 may include clock 765, CPU 770, memory such as read only memory (ROM) 785 and random access memory (RAM) 780 and co-processor 775 among others. These controller components may be connected to a system bus 760, and through the system bus 760 to an interface bus 735. Further, user input devices 705, peripheral devices 710, co-processor devices 715, and the like, may be connected through the interface bus 735 to the system bus 760. The interface bus 735 may be connected to a number of interface adapters such as processor interface 740, input output interfaces (I/O) 745, network interfaces 750, storage interfaces 755, and the like.

Processor interface 740 may facilitate communication between co-processor devices 715 and co-processor 775. In one implementation, processor interface 740 may expedite encryption and decryption of requests or data. Input output interfaces (I/O) 745 facilitate communication between user input devices 705, peripheral devices 710, co-processor devices 715, and/or the like and components of the controller 700 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 750 may be in communication with the network 730. Through the network 730, the controller 700 may be accessible to remote terminal devices 720. Network interfaces 750 may use various wired and wireless connection protocols such as, direct connect, Ethernet, wireless connection such as IEEE 802.11a-x, and the like.

Examples of network 730 include the Internet, Local Area Network (LAN), Metropolitan Area Network (MAN), a Wide Area Network (WAN), wireless network (e.g., using Wireless Application Protocol WAP), a secured custom connection, and the like. The network interfaces 750 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 755 may be in communication with a number of storage devices such as, storage devices 790, removable disc devices, and the like. The storage interfaces 755 may use various connection protocols such as Serial Advanced Technology Attachment (SATA), IEEE 1394, Ethernet, Universal Serial Bus (USB), and the like.

User input devices 705 and peripheral devices 710 may be connected to I/O interface 745 and potentially other interfaces, buses and/or components. User input devices 705 may include card readers, finger print readers, joysticks, keyboards, microphones, mouse, remote controls, retina readers, touch screens, sensors, and/or the like. Peripheral devices 710 may include antenna, audio devices (e.g., microphone, speakers, etc.), cameras, external processors, communication devices, radio frequency identifiers (RFIDs), scanners, printers, storage devices, transceivers, and/or the like. Co-processor devices 715 may be connected to the controller 700 through interface bus 735, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 700 may employ various forms of memory including on-chip CPU memory (e.g., registers), RAM 780, ROM 785, and storage devices 790. Storage devices 790 may employ any number of tangible, non-transitory storage devices or systems such as fixed or removable magnetic disk drive, an optical drive, solid state memory devices and other processor-readable storage media. Computer-executable instructions stored in the memory may include the notification platform 150 having one or more program modules such as routines, programs, objects, components, data structures, and so on that perform particular tasks or implement particular abstract data types. For example, the memory may contain operating system (OS) component 795, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 700 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 700 may be distributed electronically over the Internet or over other networks (including wireless networks). Those skilled in the relevant art(s) will recognize that portions of the notification system may reside on a server computer, while corresponding portions reside on a client computer. Data structures and transmission of data particular to aspects of the controller 700 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

The invention claimed is:

1. A method for operating a notification platform, the method comprising:
   receiving sensor information from one or more sensors associated with an Internet of Things (IoT) device;
      wherein the sensor information is received in response to detecting a triggering event associated with the IoT device,
      wherein the triggering event is a scan of the IoT device, and
      wherein the notification platform identifies one or more sources of the scan;
   determining capabilities of the IoT device;
   based on the determined capabilities of the IoT device, activating at least one additional sensor associated with the IoT device to collect additional information related to the triggering event;
   in response to receiving the sensor information, identifying a set of notification rules associated with the IoT device and the detected triggering event,
      wherein rules in the set of notification rules identify notification recipients and at least one associated notification to be delivered to the notification recipients; and
   in accordance with the identified set of notification rules, sending one or more notification signals to one or more of the notification recipients identified in the set of notification rules,
      wherein the one or more notification signals comprise at least some of the received sensor information and at least some of the collected additional information.

2. The method of claim 1, wherein the sent notification signals initiate defense mechanisms or data scrubbing.

3. The method of claim 1, wherein the set of notification rules identify mechanisms for delivery of the notification signals to the one or more of the notification recipients identified in the set of notification rules.

4. The method of claim 1, wherein the triggering event further comprises an acoustic signature associated with the IoT device.

5. The method of claim 1, wherein the triggering event further comprises an acceleration or deceleration signature associated with the IoT device.

6. The method of claim 1, wherein the triggering event further comprises a movement signature associated with the IoT device.

7. The method of claim 1, wherein the triggering event includes current state information associated with the IoT device, and environment information associated with the IoT device.

8. The method of claim 1, wherein the received sensor information includes one or more of:
   images,
   videos,
   laser scans,
   RF scans,
   accelerations,
   acoustic patterns,
   haptics, or
   movement.

9. The method of claim 1, further comprising:
   collecting, from one or more application servers, additional information regarding surroundings of the IoT device,
      wherein the notification signals include the additional information regarding the surroundings of the IoT device.

10. The method of claim 1, further comprising transmitting, based on a type of the triggering event, at least one of the notification signals to an insurance company, or a police department, or a third-party.

11. The method of claim 1, further comprising:
   identifying a subscriber associated with the IoT device; and
   in response to identifying the subscriber, retrieving from a database a set of subscriber notification rules associated with the subscriber,
      wherein rules in the set of subscriber notification rules associated with the subscriber identify at least one associated notification to be delivered to the subscriber.

12. The method of claim 1, wherein the notification signals comprise:
   source of the triggering event,
   identity of a channel over which the sensor information was received,
   identity of the IoT device,
   the sensor information,
   time stamp of receipt of the sensor information,
   location information of the IoT device,
   or any combination thereof.

13. A non-transitory computer-readable medium having instructions stored thereon that when executed by one or more processors cause a machine to:
   receive sensor information from one or more sensors associated with an Internet of Things (IoT) device;

wherein the sensor information is received in response to detecting a triggering event associated with the IoT device;
wherein the triggering event is a scan of the IoT device; and
wherein the machine identifies one or more sources of the scan;
in response to receiving the sensor information, identify a set of notification rules associated with the IoT device and the detected triggering event,
wherein rules in the set of notification rules identify notification recipients and at least one associated notification to be delivered to the notification recipients; and
in accordance with the identified set of notification rules, sending one or more notification signals to one or more of the notification recipients identified in the set of notification rules,
wherein the one or more notification signals comprise at least some of the received sensor information.

14. The non-transitory computer-readable medium of claim 13, wherein the instructions when executed by the one or more processors cause the machine to:
determine capabilities of the IoT device; and
based on the determined capabilities of the IoT device, activate at least one additional sensor associated with the IoT device to collect additional information related to the triggering event.

15. The non-transitory computer-readable medium of claim 13, wherein the instructions when executed by the one or more processors cause the machine to:
collect, from one or more application servers, additional information regarding surroundings of the IoT device, wherein the notification signals include the additional information regarding the surroundings of the IoT device.

16. The non-transitory computer-readable medium of claim 13, wherein upon identifying the triggering event, the instructions when executed by the one or more processors cause the machine to:
send a request to the IoT device to collect any videos or pictures from one more cameras associated with the IoT device.

17. The non-transitory computer-readable medium of claim 13, wherein the instructions when executed by the one or more processors cause the machine to:
identify a subscriber associated with the IoT device; and
in response to identifying the subscriber, retrieve from a database a set of subscriber notification rules associated with the subscriber,
wherein rules in the set of subscriber notification rules associated with the subscriber identify at least one associated notification to be delivered to the subscriber.

18. At least one application running on a computing device, wherein the at least one application is configured to:
receive sensor information from one or more sensors associated with an Internet of Things (IoT) device;
wherein the sensor information is received in response to detecting a triggering event associated with the IoT device;
wherein the triggering event is a scan of the IoT device; and
wherein the application identifies one or more sources of the scan;
in response to receiving the sensor information, identify a set of notification rules associated with the IoT device and the detected triggering event,
wherein rules in the set of notification rules identify notification recipients and at least one associated notification to be delivered to the notification recipients; and
in accordance with the identified set of notification rules, sending one or more notification signals to one or more of the notification recipients identified in the set of notification rules,
wherein the one or more notification signals comprise at least some of the received sensor information.

19. The at least one application of claim 18 further configured to:
determine capabilities of the IoT device; and
based on the determined capabilities of the IoT device, activate at least one additional sensor associated with the IoT device to collect additional information related to the triggering event.

20. The at least one application of claim 18 further configured to:
collect, from one or more application servers, additional information regarding surroundings of the IoT device, wherein the notification signals include the additional information regarding the surroundings of the IoT device.

* * * * *